(12) United States Patent
Hight

(10) Patent No.: US 11,147,217 B1
(45) Date of Patent: Oct. 19, 2021

(54) PLANT PROTECTION APPARATUS

(71) Applicant: Katherine Elaine Hight, Dublin, VA (US)

(72) Inventor: Katherine Elaine Hight, Dublin, VA (US)

( * ) Notice: Subject to any disclaimer, the term of this patent is extended or adjusted under 35 U.S.C. 154(b) by 205 days.

(21) Appl. No.: 16/595,534

(22) Filed: Oct. 8, 2019

(51) Int. Cl.
*A01G 13/02* (2006.01)

(52) U.S. Cl.
CPC ................................. *A01G 13/0212* (2013.01)

(58) Field of Classification Search
CPC ................ A01G 13/02; A01G 13/0206; A01G 13/0212; A01G 13/0243; A01G 13/10
See application file for complete search history.

(56) References Cited

U.S. PATENT DOCUMENTS

| | | | | |
|---|---|---|---|---|
| 1,264,419 | A * | 4/1918 | Mercer | A01G 13/0231 47/22.1 |
| 1,567,740 | A * | 12/1925 | Joseph | A01G 13/0212 47/20.1 |
| 5,339,848 | A * | 8/1994 | Richmond | A45B 17/00 135/20.1 |
| 6,609,332 | B1 * | 8/2003 | Nali | A01G 13/0212 47/25.1 |
| 2010/0122490 | A1 * | 5/2010 | Stewart | A01G 13/0212 47/29.5 |
| 2012/0227318 | A1 * | 9/2012 | Harger | A01G 9/12 47/46 |
| 2014/0026475 | A1 * | 1/2014 | Centeno | A01G 13/02 47/29.5 |
| 2014/0130406 | A1 * | 5/2014 | Burrowes | A01G 13/0212 47/20.1 |
| 2020/0154648 | A1 * | 5/2020 | Callahan | A01G 13/0212 |

FOREIGN PATENT DOCUMENTS

| | | | | |
|---|---|---|---|---|
| DE | 9310571 U1 * | 8/1994 | | A45B 23/00 |
| DE | 102005039494 A1 * | 3/2007 | | F24S 30/425 |
| DE | 102013002825 A1 * | 8/2014 | | F24S 25/617 |
| FR | 423230 A * | 4/1911 | | A01G 13/0212 |
| WO | WO-2005034611 A1 * | 4/2005 | | A01G 13/0225 |

* cited by examiner

*Primary Examiner* — Kristen C Hayes
(74) *Attorney, Agent, or Firm* — Gulf Coast Intellectual Property Group

(57) ABSTRACT

A plant protection apparatus that is configured to be placed adjacent a plant and provide control of the amount of sunlight and water to which the plant is exposed. The plant protection apparatus includes a body having a central portion, a first portion and a second portion. The first portion and second portion are movably mounted to opposing sides of the central portion. The first portion and second portion are planar in manner and are movably intermediate a first position and second position. The plant protection apparatus is further configured to have a controller and a first sensor and a second sensor wherein the first sensor and second sensor are operably coupled to the controller. The body is secured to a mounting rod that is configured to be inserted into soil adjacent to plant. The mounting rod is of sufficient length so as to position the body above the plant.

7 Claims, 1 Drawing Sheet

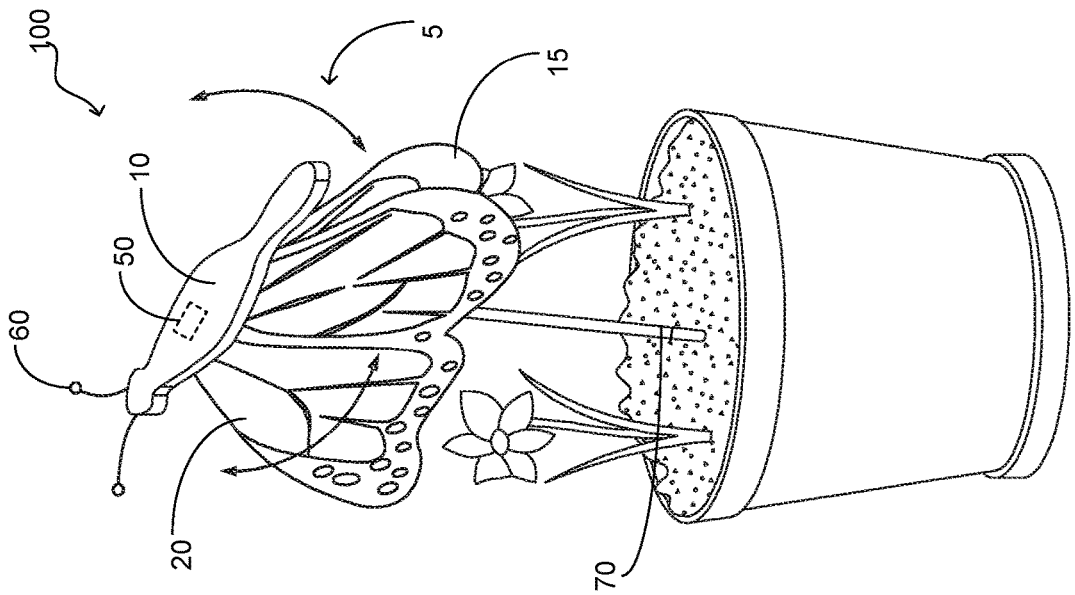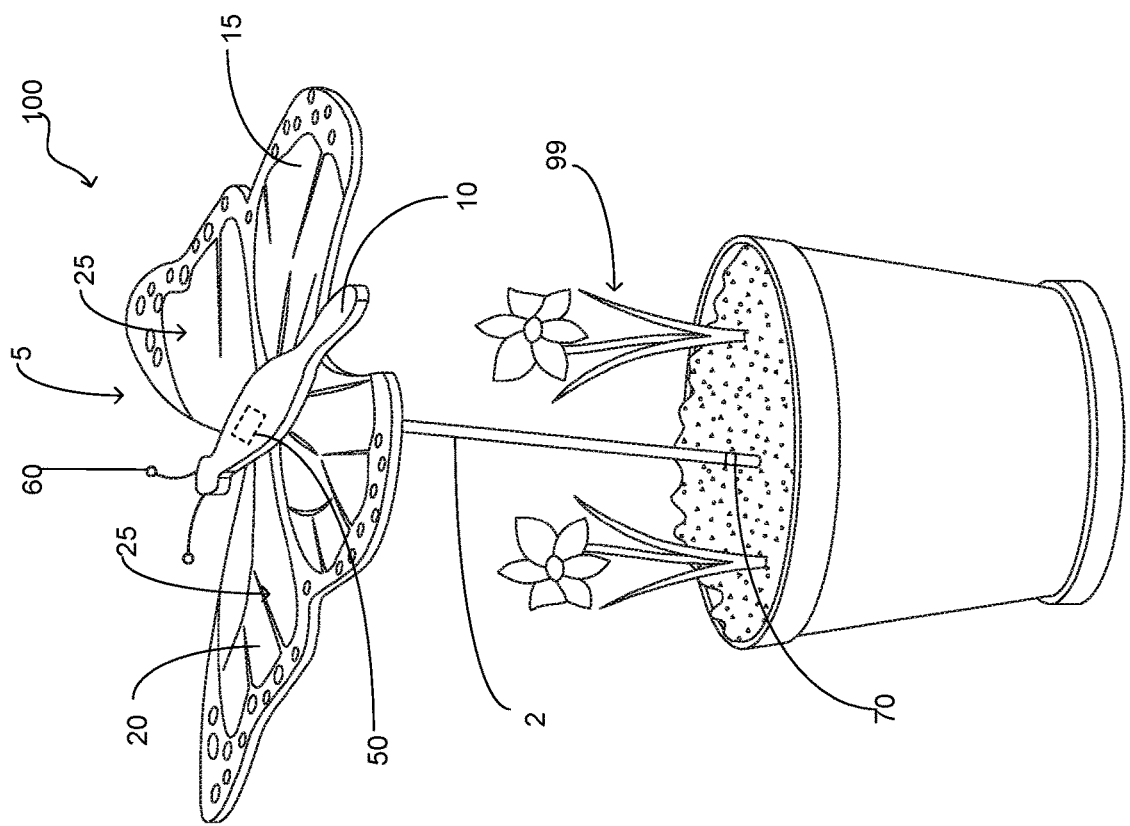

US 11,147,217 B1

PLANT PROTECTION APPARATUS

FIELD OF THE INVENTION

The present invention relates generally to horticulture, more specifically but not by way of limitation, a plant protection apparatus that is operable to protect plants that are typically planted in a pot or similar device wherein the plant protection apparatus protects plants from excessive exposure to sun and/or rain.

BACKGROUND

Millions of homeowners engage in various projects around their homes with the purpose of enhancing the physical appearance of a room or area. One such project that is routinely utilized is the installation of plants. The types of plants that are installed vary widely and include but are not limited to annuals and perennials. Homeowners will typically install the plants either in flowerbeds or containers such as flowerpots. When deciding on where to install different types of plants the homeowner will typically evaluate the amount of sunlight and water that the plant will receive. This is required to ensure that the installation of the plant is successful so as to be able to grow healthily.

One problem with being limited as to where a plant is the limitation that a homeowner cannot plant a desired species in a desired location. If a plant requires that it only receive four to six hours per day sunlight, a homeowner is limited to the places where the plant can be placed. Many sensitive plants can be easily burned or damaged if they are exposed to too much sunlight. Another issue with the maintenance of plants is controlling the amount of water that is provided to a plant. While homeowners typically engage in a manual watering routine, if a plant is in a pot on a patio that is exposed, the plant can receive too much water in the event of a rainstorm. Many plants can be damaged or killed in the event of receiving too much water in a short amount of time.

Accordingly, there is a need for a plant protection apparatus that is operable to be inserted adjacent to a plant and provide protection from excessive exposure to elements such as light and water.

SUMMARY OF THE INVENTION

It is the object of the present invention to provide a plant protection apparatus that is operable to inhibit excessive exposure to light and water wherein the plant protection apparatus is mounted adjacent to a plant.

Another object of the present invention is to provide a plant protection apparatus that is operable to protect a plant from excessive light and water that includes a body superposed above the plant wherein the body includes a first portion and a second portion movably coupled.

A further object of the present invention is to provide a plant protection apparatus that is configured to reduce exposure to light and water for a plant that the plant protection apparatus is place proximate thereto wherein first portion and second portion of the body are movable intermediate a first portion and a second portion.

Still another object of the present invention is to provide a plant protection apparatus wherein the body further includes a central portion with the central portion being intermediate the first portion and second portion.

An additional object of the present invention is to provide a plant protection apparatus that is configured to control exposure of light and water to a plant proximate thereto that further includes a controller operable to move the first portion and second portion intermediate their first position and second position.

Yet a further object of the present invention is to provide a plant protection apparatus that further includes a photo sensor configured to detect the amount of sunlight exposure received within a determined time period.

Another object of the present invention is to provide a plant protection apparatus that is operable to inhibit excessive exposure to sunlight and water to a plant adjacent thereto that further includes a water sensor operable to detect the amount of water in the soil in which the plant protection apparatus is inserted.

An alternative object of the present invention is to provide plant protection apparatus that includes a power supply and controller configured to control the operations thereof.

Yet a further object of the present invention is to provide a plant protection apparatus wherein the body is formed in the shape of at least one of the following: flower, insect or animal.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a perspective view of an embodiment of the present invention with the body in its first position; and FIG. 2 is a perspective view of an embodiment of the present invention with the body in its second position.

DETAILED DESCRIPTION

Referring now to the drawings submitted herewith, wherein various elements depicted therein are not necessarily drawn to scale and wherein through the views and figures like elements are referenced with identical reference numerals, there is illustrated a plant protection apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the plant protection apparatus 100 includes body 5 that is comprised of a center portion 10, first portion 15 and second portion 20. The first portion 15 is movably coupled to the center portion 10 utilizing suitable durable techniques. A second portion 20 is movably mounted to the center portion 10 opposite the first portion 10. The second portion 20 is movably mounted to the center portion 10 utilizing suitable durable techniques. The first portion 15 and second portion 20 are generally planar in manner having an upper surface 25 that is of suitable size so as to provide cover for an exemplary plant 99 proximate to the plant protection apparatus 100. It is contemplated within the scope of the present invention that the first portion 15 and second portion 20 could be formed in various different sizes and shapes. As illustrated herein, a preferred embodiment of the plant protection apparatus 100 is to form the body 5 so as to resemble a butterfly wherein the first portion 15 and second portion 20 are formed so as to resemble the wings of a butterfly. While the body 5 is illustrated herein as being formed to resemble a butterfly, it is contemplated within the scope of the present invention that the body 5 could be formed to resemble various wildlife and other objects such as but not limited to insects, birds and flowers. It is further contemplated within the scope of the present invention that an embodiment of the body 5 could comprise only a first portion 15 and a second portion 20 wherein the first portion 15 and second portion 20 are hingedly coupled. The body 5 is manufactured from a suitable rigid material such as but not limited to plastic or metal.

The first portion 15 and second portion 20 are configured to be movable intermediate a first position and a second position. The first portion 15 and second portion 20 are planar in manner so as to provide sufficient surface area coverage when in their first position. As shown in particular in FIG. 1, in the first position, the first portion 15 and second portion 20 are extended outward from the central portion 5 so as to provide a large surface area and as such substantially cover an exemplary plant 99 underneath. As illustrated herein in FIG. 2, the first portion 15 and second portion 20 are shown in their second position. In their second position the first portion 15 and second portion 20 are positioned such that the first portion 15 and second portion 20 have been moved closer to the central portion 10 and as such reducing the coverage area provided thereby for an exemplary plant 99. The plant protection apparatus 100 functions to substantially inhibit sunlight and/or water from contacting an exemplary plant 99 placed underneath. In the first position wherein the first portion 15 and second portion 20 are extending outward from the central portion 10, the plant protection apparatus 100 provides a sufficient coverage area so as to inhibit sunlight and/or water from contacting the exemplary plant 99. This is desirable so as to inhibit excessive exposure to sunlight for an exemplary plant 99 that requires less sunlight than that it is exposed to based on its environmental location. As will be further discussed herein it is contemplated within the scope of the present invention that the first portion 15 and second portion 20 could be operably moved intermediate their first position and their second position utilizing various techniques.

The body 5 is secured to mounting rod 2 utilizing suitable durable techniques. The mounting rod 2 is manufactured from a suitable durable material such as but not limited to plastic or metal. No specific length of the mounting rod 2 is required but it is contemplated within the scope of the present invention that the mounting rod 2 is of sufficient length so as to position the body 5 such that the body 5 is above the exemplary plant 99 to which it is adjacent.

Disposed within the central portion 10 is controller 50. Controller 50 includes the necessary electronics to store, receive, manipulate and transmit data. The controller 50 is operably coupled to first sensor 60 and second sensor 70. First sensor 60 is mounted on the central portion 10 and is operable to detect the amount of sunlight exposure over a discrete time period. The first sensor 60 is a photo sensor and is operable to transmit sunlight exposure to the controller 50 wherein the controller 50 process the data transmission in order to determine the desired position for the first portion 15 and second portion 20. By way of example but not limitation, if a controller 50 is programmed to detect six hours of sunlight exposure for an exemplary plant 99, subsequent the exceeding of six hours of sunlight exposure, the controller 50 will facilitate the transition of the first portion 15 and second portion 20 to their first position so as to inhibit sunlight exposure to the exemplary plant 99. It is contemplated within the scope of the present invention that the controller 50 could be programmed to detect numerous amounts of sunlight exposure so as to accommodate various types of exemplary plants 99. It is further contemplated within the scope of the present invention that the first sensor 60 could be mounted in numerous different positions on the body 5. Additionally, it is further contemplated within the scope of the present that the plant protection apparatus 100 could employ more than one first sensor 60.

The second sensor 70 is operably coupled to the controller 50 and is mounted on the mounting rod 2 distal to body 5. The second controller 70 is operably coupled to the controller 50 utilizing suitable durable techniques. The second sensor 70 is a moisture sensor and is operable to detect the amount of moisture in the soil in which the exemplary plant 99 is planted. Depending upon the amount of moisture detected in the soil by the second sensor 70, the controller 50 will place the first portion 15 and second portion 20 in either their first position or second position. More specifically but not by way of limitation, if the second sensor 70 detects an insufficient amount of moisture in the soil adjacent to the exemplary plant 99, a signal is transmitted to the controller 50 to place the first portion 15 and second portion 20 in their second position so as to allow any precipitation to contact the soil adjacent the exemplary plant.

While not particularly illustrated herein, it should be understood by those skilled in the art that the controller 50 could employ a conventional electric motor or similar device so as to manipulate the first portion 15 and second portion 20 intermediate their first position and second position. It should be further understood that the controller 50 includes a conventional power supply such as but not limited to a photovoltaic cell or lithium ion battery. It is further contemplated within the scope of the present invention that an alternative embodiment of the present invention would not include the controller 50 and the first portion 15 and second portion 20 could be manually manipulated to either their first position or the second position. Additionally, it is contemplated within the scope of the present invention that the plant protection apparatus 100 could be provide without the first sensor 60 and second sensor 70.

While the first portion 15 and second portion are illustrated herein as being an a downward position, it is contemplated within the scope of the present invention that the first portion 15 and second portion 20 could be angled upwards past horizontal so as to allow light and/or water to contact the exemplary plant 99

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A plant protection apparatus that is configured to inhibit excessive exposure to sunlight and water for a plant that is planted in a plant container having an outer wall to which the plant protection apparatus has been placed adjacent thereto comprising:
   a body, said body having a central portion, said central portion having a first side and a second side, said body further having a first portion, said first portion being movably secured to said first side of said central portion, said first portion being flat and including an upper surface, said first portion having a lateral edge defining a shape of the first portion, said lateral edge being level with said upper surface of said first portion, said body having a second portion, said second portion being movably secured to said second side of said body, said second portion being flat and including an upper surface, said second portion having a lateral edge defining a shape of the second portion, said lateral edge of said second portion being level with said upper surface of said second portion, said first portion and said second portion of said body having a first position and a second position, wherein at least a portion of said lateral edge of said first portion and said lateral edge of said second portion extend beyond the outer wall of the plant container in said first position;
   a controller, said controller being mounted within said central portion of said body, said controller operably coupled to said first portion and said second portion, said controller configured to move said first portion and said second portion intermediate said first position and said second position; and
   a mounting rod, said mounting rod having a first end and a second end, said body being secured to said first end, said second end of said mounting rod being inserted into soil adjacent to a plant, said mounting rod being of sufficient length so as to position said body above the plant.

2. The plant protection apparatus as recited in claim 1, said body further including a first sensor, said first sensor being mounted to said body, said first sensor being operably coupled to said controller, said first sensor being a photo sensor.

3. The plant protection apparatus as recited in claim 2, said body further including a second sensor, said second sensor being secured to said second end of said mounting rod, said second sensor being operably coupled to said controller, said second sensor being a moisture detection sensor.

4. The plant protection apparatus as recited in claim 3, wherein in said first position said first portion and said second portion are positioned so as to extend outward from said body wherein said first portion and said second portion are in axial alignment.

5. The plant protection apparatus as recited in claim 4, wherein in said second position said first portion and said second portion are positioned with respect to the central portion such that the first portion and second portion are angular thereto.

6. The plant protection apparatus as recited in claim 5, wherein said body is formed in the shape of a butterfly.

7. The plant protection apparatus as recited in claim 5, wherein said body is formed in the shape of an animal.

* * * * *